United States Patent [19]

Terrill

[11] Patent Number: 5,335,438
[45] Date of Patent: Aug. 9, 1994

[54] DEER FLAGGING APPARATUS

[76] Inventor: David E. Terrill, Rte. 1, Box 29-7, Gore, Okla. 74435

[21] Appl. No.: 972,687

[22] Filed: Nov. 6, 1992

Related U.S. Application Data

[63] Continuation-in-part of Ser. No. 811,641, Dec. 23, 1991, abandoned.

[51] Int. Cl.⁵ ............................................. A01M 31/06
[52] U.S. Cl. .................................................... 43/1
[58] Field of Search ................ 43/1; 116/22 R, 22 A; 446/487, 488; 160/10; 40/539, 218, 586

[56] References Cited

U.S. PATENT DOCUMENTS 5,029,408 7/1991 Smith ............................................. 43/1

Primary Examiner—Kurt C. Rowan
Attorney, Agent, or Firm—Henderson & Sturm

[57] ABSTRACT

A deer flagging apparatus (10) for attracting whitetail deer by simulating the flash of the rump patch and/or flag of a deer by the use of a rotatable, tether actuated, hinged flag member (50) whose inner surfaces (53") (54") bear indicia representative of the rump patch and/or flag of a whitetail deer which can be intermittently exposed in an incremental rotary fashion by the application of tension on the tether member (60).

14 Claims, 3 Drawing Sheets

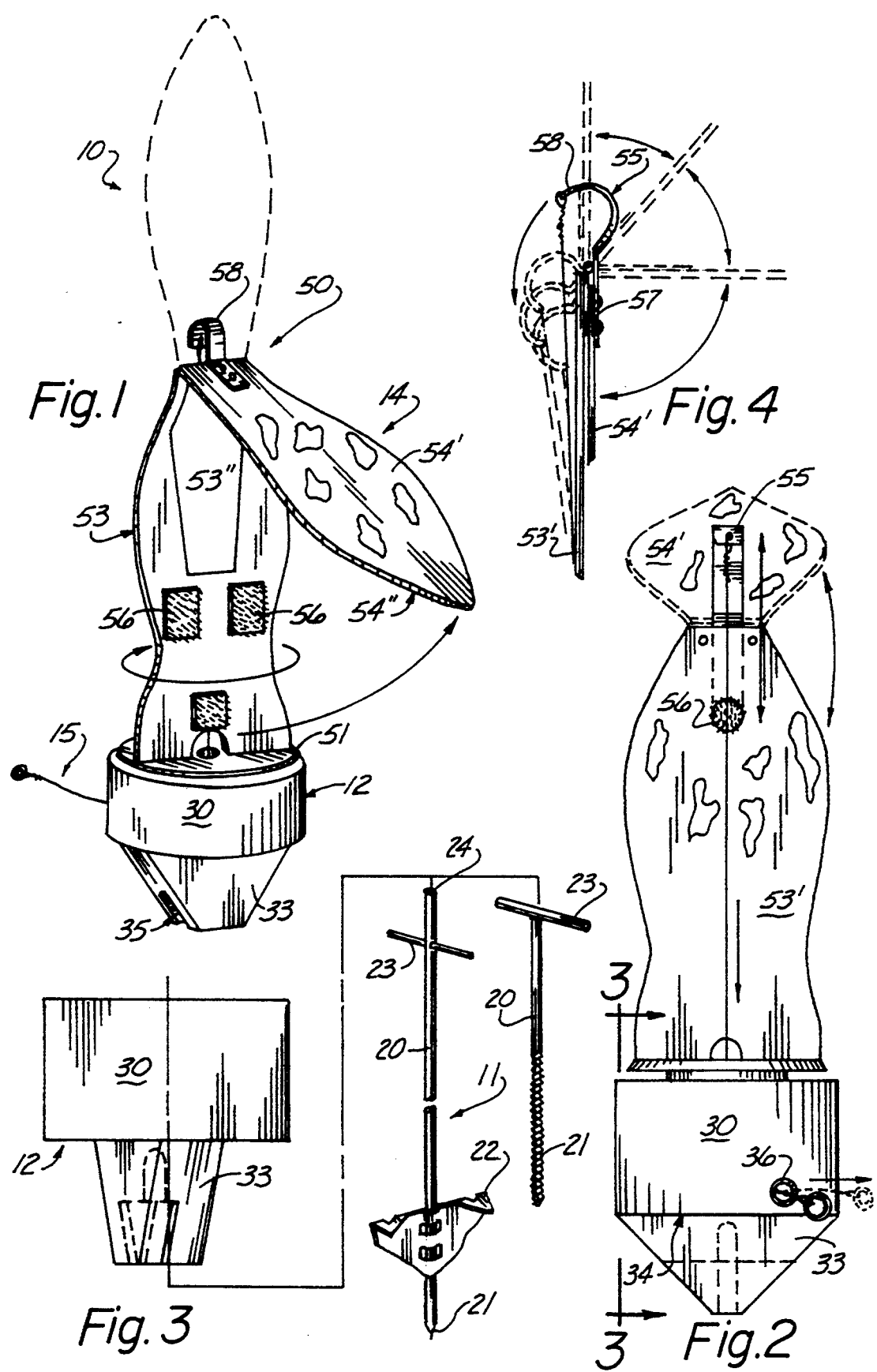

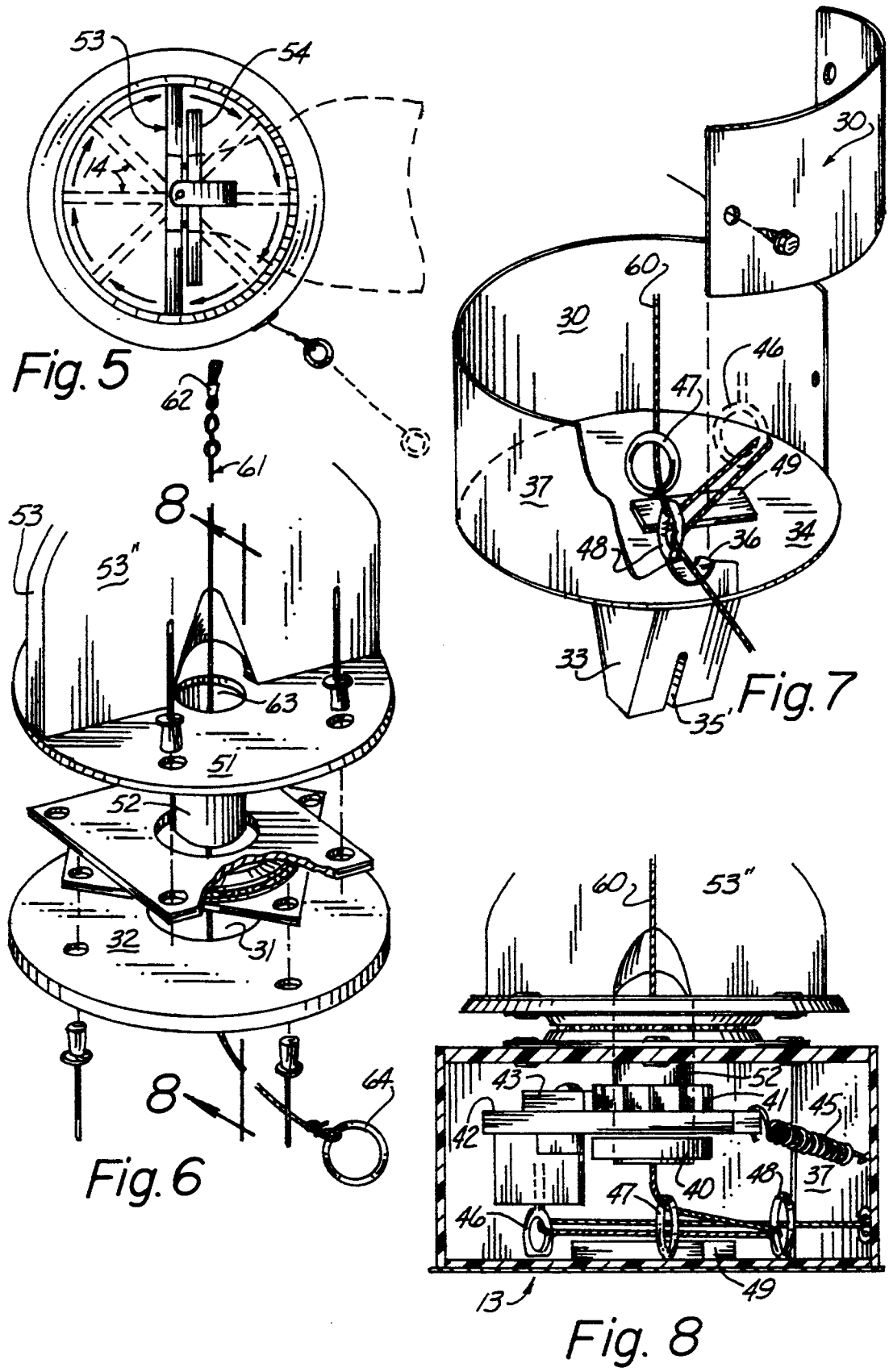

DEER FLAGGING APPARATUS

This is a continuation-in-part of copending application Ser. No. 07/811,641 filed on Dec. 23, 1991, now abandoned.

TECHNICAL FIELD

The present invention relates to the field of deer attracting devices, and in particular to an intermittently actuated and sequentially rotated simulated deer flagging apparatus.

BACKGROUND ART

This is a continuation in part application of copending patent application Ser. No. 07/811,641 which was filed in the U.S. Patent Office on Dec. 23, 1991 and was entitled THE FLAGGER, the disclosure of which in its entirety is incorporated by reference thereto herein, now abandoned.

As can be seen by reference to the following U.S. Pat. No. 5,029,408; the prior art has at least one patented structure devoted to the attraction of deer by a simulated flagging apparatus.

While this aforementioned prior art construction is at least marginally adequate for the basic purpose and function for which it was specifically designed, this invention also suffers in a number of significant areas with regard to its ability to effectively attract deer.

To begin with the '408 patent discloses a very large, cumbersome, and structurally complex device that will be very expensive to purchase as well as very difficult to transport into the field.

In addition, the flag component of the '408 patent is not only limited to a single arc of rotation in the vertical plane; but is also unfortunately visible at close range in an arc of approximately 360° which is counterproductive from the standpoint of both attracting a deer to, and maintaining a deer in, the vicinity of the deer attracting device.

Furthermore, the mere size of the '408 device insures that the structure per se will be visible to deer from a substantial distance; and, since this structure is obviously man made, the mere presence of the device should naturally make the deer reluctant to venture too near the location in which the device is installed.

As a consequence of the foregoing situation, there has existed a longstanding need among deer hunters for a relatively inexpensive, simple and compact deer flagging apparatus whose operation is directly controlled by the user; in such a manner, as to simulate the flagging of a deer in a sequential, moveable fashion; and, the provision of such a construction is a stated objective of the present invention.

DISCLOSURE OF THE INVENTION

Briefly stated, the deer flagging apparatus that forms the basis of the present invention comprises a support unit, a housing unit, a rotational unit; a flag unit; and, an actuating unit.

The housing unit rests upon the support unit in such a manner that the rotational unit will cause the housing unit to rotate relative to the support unit through a series of predetermined arcs in the horizontal plane.

In addition, the actuating unit is operatively connected to both the flag unit and the rotational unit in such a manner that the housing unit will rotate through a predetermined arc prior to the flag unit being visibly deployed whereupon once the flag unit has been lowered the actuating unit is then capable of containing the sequence through the next predetermined arc.

As will be explained in greater detail further on in the specification, the deer flagging apparatus of this invention represents a significant advance over the device described in the '408 patent in that it is lightweight, compact, and presents a very slim profile when viewed from the sides.

In addition, this deer flagging apparatus is designed and constructed so as to only display the underside of the flag unit to a restricted arcuate segment at any given time as the flag unit is rotated in an intermittent sequential, arcuate fashion.

In this manner, the deer flagging apparatus of this invention represents a significant and extremely effective improvement and advancement int he art of attracting deer via simulated flag displays.

BRIEF DESCRIPTION OF THE DRAWINGS

These and other attributes of the invention will become more clear upon a thorough study of the following description of the best mode for carrying out the invention, particularly when reviewed in conjunction with the drawings, wherein:

FIG. 1 is a perspective view of the deer flagging apparatus that forms the basis of the present invention;

FIG. 2 is a rear elevation view of the deer flagging apparatus;

FIG. 3 is an exploded perspective view of the cooperation between the support unit and the housing unit of the invention;

FIG. 4 is a side elevation view of the upper portion of the deer flagging unit;

FIG. 5 is a top plan view of the deer flagging apparatus;

FIG. 6 is an exploded perspective view of the operative engagement between the flagging unit and the housing unit;

FIG. 7 is a cut away view of the housing unit;

FIG. 8 is a cross-sectional view of the housing unit; and,

BEST MODE FOR CARRYING THE INVENTION

Figure 9:
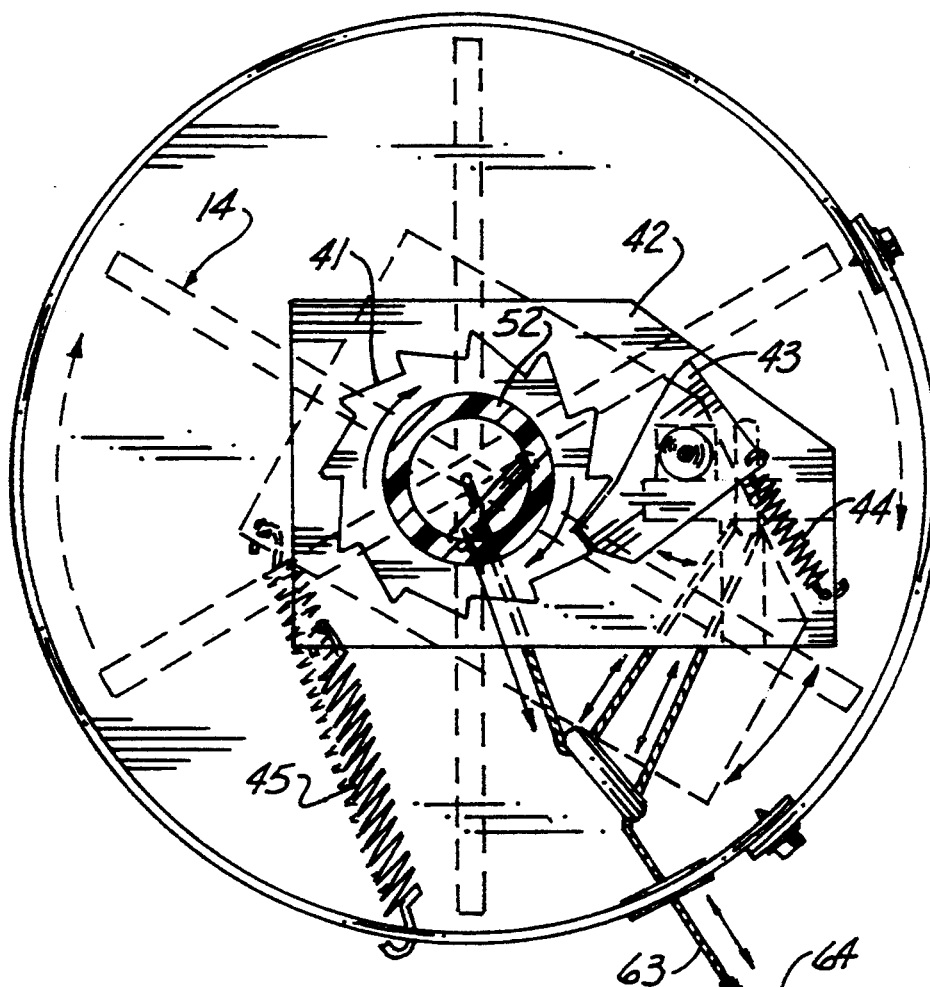
FIG. 9 is a top plan view of the internal actuating mechanism contained within the housing unit.

As can be seen by reference to the drawings, and in particular to FIGS. 1, 3 and 8 the deer flagging apparatus that forms the basis of the present invention is designated generally by the reference numeral (10). The apparatus (10) comprises in general a support unit (11) a housing unit (12); a rotational unit (13) a flag unit (14); and, an actuating unit (15). These units will now be described in serlatim fashion.

As can best be seen by reference to FIG. 3 the support unit (11) comprises an elongated generally rigid support post member (20) having a ground penetrating point (21) formed on the lower end; a stabilizing plate (22) disposed at a spaced location from the lower end (21); and, a cross-arm element (23) deposed proximate to, but spaced from, the upper end of the post member (20).

As shown in FIGS. 1 through 3, 6 and 7 the housing unit (12) comprises a generally short cylindrical housing member (30) having an enlarged opening (31) formed in the top surface (32) and a downwardly depending mounting element (33) affixed to the bottom surface (34); wherein, the mounting element (33) is provided with a suitably configured recess (35), for receiving the cross-arm element (23) and the upper end (24) of the post member 920), to prevent relative rotation between the housing member (30) and the support post member (20) in their assembled relationship.

In addition the housing member (30) is further provided with a discrete aperture (36) formed in the sidewall (37) of the housing member (30); wherein, the purpose and function of the discrete aperture (36) will be explained further on in the specification in detail.

As shown in FIGS. 1, 2, 4 and 5 the flag unit (14) comprises a hinged flag member (50) mounted on a generally flat apertured base member (51) having a hollow stem element (52) which extends through the enlarged opening (31) in the housing member (30).

As can best be seen by reference to FIGS. 1, 2, and 4 the hinged flag member (50) comprises a first contoured generally flat rigid panel element (53) whose lower end is fixedly secured to a base member (51), and whose upper end is hingedly secured to a second contoured generally flat, rigid panel element (54() via a hinge (55).

As can best be appreciated by reference to FIGS. 1, 2 and 4 the outer surfaces (53') and (54') of the first and second panel elements 53 (54) are provided with a camouflage pattern; whereas, the opposed inner surfaces (53''') and (54'') of the first and second panel elements (53) and (54) are painted to resemble respectively the white rump patch and flag of a whitetail deer.

In addition, the opposed inner surfaces (53'') (54'') of the first and second panel elements (53) (54) are provided with cushion elements (56) so that no audible sound is created as the opposed inner surfaces (53'') (54''0 come into contact with one another in their intended mode of operation.

As can also be seen by reference to FIGS. 1, 2 and 4 the upper end of the outer surface (54'') of the second panel element (54) is provided with a bracket element (57) having an upwardly projection apertured hook portion (58) whose purpose and function will be described presently.

As can best be seen by reference to FIGS. 6 through 9, the rotational unit (13) comprises a locking collar (40) and a toothed ratchet collar (41) fixedly secured to the lower portion of the hollow stem element (52) of the base member (51), and disposed on opposite sides of a spring biased support plate (42), which is supported by the locking collar (40) for relative rotation with respect to the hollows stem element (52).

In addition the upper surface of the support plate (42) is provided with a spring biased ratchet arm (43) which is pivotally secured on one end to the support plate (42); wherein, the other end of the ratchet arm (43) is urged into engagement with the toothed ratchet collar (41) under the influence of the ratchet arm spring member (44).

Referring now to FIG. 9, it can be seen that one corner of the support plate (42) is connected to one end of a helical spring element(45); wherein, the other end of the helical spring element (45) is connected to the sidewall (37) of the housing member (30). Furthermore, the bottom surface of the support plate (42) is provided with a downwardly depending eyelet element (46) which is offset from the point of attachment between the helical spring element (45) and the support plate (42).

In addition, the rotational unit (13) also comprises a pair of eyelets (47) (48) and an elongated stop element (49) to the interior bottom surface (34) of the housing member (30); wherein, one of the eyelets (47) is disposed beneath the hollow stem element (52), the other eyelet (48) is disposed proximate the discrete aperture (36) in the housing sidewall (37); and, the stop element (49) is disposed intermediate the pair of eyelets (47) (48).

Turning once again to FIG. 6 through 9, it can be seen that the actuating unit (15) comprises an elongated tether member (60) preferably fabricated from clear monofilament fishing line for reduced visibility; wherein, one end (61) of the tether member (60) is connected by a swivel element (62) to the apertured hook portion (58) of the bracket element (57) attached to the second panel element (54) to cause the second panel element (54) to pivot upwardly relative to the first panel element (53) to expose the simulated rump patch and flag when desired.

In addition as shown in FIGS. 6 and 8 the intermediate portion (63) of the tether member (60) is threaded through the hollow stem element (52) of the base member (51) and the opening (31) in the top (32) of the housing member (30); whereupon the intermediate portion (63) of the tether member (60) is threaded through the eyelets (46) (47) (48) of the rotational unit (13) and then passes through the discrete aperture (36) in the housing member (30).

At this juncture the intermediate portion (63) of the tether member (60) is provided with a stop element (64) which will limit the length of the tether member (60) that can be retracted inside the housing member (30) through the action of these helical spring element (45) of the rotational unit (13).

The remaining elongated length (65) of the tether member (60) then extends to a distant location wherein the user can actuate the deer flagging apparatus by exerting force on the outboard end (66) of the tether member (60) by either manual or mechanical means (67).

When tension is applied to the outboard end of the tether member (60) the ratchet arm (43) will first rotate the ratchet collar (41) of the base member (51) of the flag unit (14) through a predetermined arc; whereupon, the tension force will be applied directly to the apertured hook portion (58) of the bracket element (57), causing the second panel (54) to pivot upwardly exposing the inner surfaces (53'') (54'') which simulate the rump patch and flag of a deer.

Once the tension is released from the outboard end (66) of the tether member (60), the second panel (54), under the influence of gravity, will resume its original opposed face relationship with the first panel (53) removing the source of visual stimulation from view.

Thereupon each successive application and release of tension on the outboard end (66) of the tether member (60) will cause the flag unit (14) to continue to rotate through successive predetermined arcs to intermittently expose the inner surfaces (53'') (54'') of the flag member (50).

In this manner intermittent visual stimulation over a complete 360° field of view can be directly controlled by the user to cause deer to be attracted to the source of visual simulation.

In addition, given the slim profile and camouflaged exterior surface of the deer flagging apparatus (10), deer will approach in close proximity to the apparatus (10) before becoming aware of its presence.

It should further be appreciated at this juncture that with each release of tension on the tether member (60), the helical spring element (45) will cause the support plate (42) and ratchet arm (43) to rotate relative to the ratchet collar (41) and the hollow stem element (52) of the base member (51) to effect the incremental rotation of the flag unit (14).

Having thereby described the subject matter of the present invention, it should be apparent that many substitutions, modifications and variations of the invention are possible in light of the above teachings. It is therefore to be understood that the invention as taught and described herein is only to be limited to the extent of the breadth and scope of the appended claims.

I claim:

1. A deer flagging apparatus for attracting whitetail deer by simulating the exposure of the flag of a whitetail deer; wherein, the apparatus comprises:
    a support unit including an elongated support member;
    a housing member disposed on said support member;
    a flag unit disposed on said housing member and including first and second contoured panels having inner and outer surfaces wherein said panels are hingedly connected together; and
    means for pivoting said second panel relative to said first panel to visibly expose the inner surfaces of said first and second panels.

2. The apparatus as in claim 1, further comprising:
    means for rotating said flag unit about a vertical axis relative to said housing member.

3. The apparatus as in claim 2; wherein, said means for rotating and said means for pivoting both include an elongated tether member.

4. The apparatus as in claim 1; wherein, the inner surface of one of said panels is provided with indicia representative of the flag of a whitetail deer.

5. The apparatus as in claim 4; wherein, the outer surfaces of the first and second panels are provided with a camouflage pattern.

6. The apparatus as in claim 2; further comprising:
    means for intermittently limiting the rotation of said flag unit about a vertical axis relative to said housing unit to a predetermined arc of rotation.

7. A deer flagging apparatus for attracting whitetail deer by simulating the exposure of the rump patch and flag of a whitetail deer; wherein the apparatus comprises:
    a support member;
    a housing member operatively connected to said support member;
    a flag member rotatably attached to said housing member and including first and second hinged panels having inner and outer surfaces; wherein, said inner surfaces are provided with indicia representative of the rump patch and flag of a whitetail deer; and
    means for pivoting said hinged panels relative to one another to visibly expose said inner surfaces.

8. The apparatus as in claim 7; further comprising:
    means for rotating said flag member about a vertical axis relative to said housing member in a predetermined arc.

9. The apparatus as in claim 7; further comprising:
    means for rotating said flag member about a vertical axis relative to said housing member in a series or predetermined arcs.

10. A deer flagging apparatus for attracting whitetail deer by simulating the exposure of the rump patch and/or flag of whitetail deer; wherein the apparatus comprises:
    a support member;
    a housing member supported by said support member;
    a flag member movably mounted on said housing member and comprising: a first panel element; a second panel element operatively associated with said first panel element and bearing indicia representative of the flag of a whitetail deer; and
    means for moving said second panel element relative to said first panel element to visibly expose said indicia on said second panel element.

11. The apparatus as in claim 10; wherein, said flag member is mounted for rotational movement relative to said housing member.

12. The apparatus as in claim 11; wherein, said first panel element is hingedly connected to said second panel element.

13. The apparatus as in claim 12; wherein, said first panel element is provided with indicia representative of the rump patch of a whitetail deer.

14. The apparatus as in claim 13; further including ratchet means for rotating the flag member relative to the housing member in an incremental fashion.

* * * * *